United States Patent
Christie et al.

(10) Patent No.: US 6,593,421 B2
(45) Date of Patent: Jul. 15, 2003

(54) FLOORING ADHESIVES BASED ON STYRENE-BUTADIENE COPOLYMERS

(75) Inventors: David Christie, Mannheim (DE); Joachim Pakusch, Speyer (DE); Eckehardt Wistuba, Bad Dürkheim (DE); Horst Seibert, Fussgönheim (DE); Peter Fickeisen, Dirmstein (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/982,939

(22) Filed: Oct. 22, 2001

(65) Prior Publication Data

US 2002/0137830 A1 Sep. 26, 2002

(30) Foreign Application Priority Data

Oct. 21, 2000 (DE) .......................................... 100 52 310

(51) Int. Cl.$^7$ ............................. C08L 25/10; C08L 33/02
(52) U.S. Cl. ....................... 524/824; 524/270; 524/272; 524/821; 524/823
(58) Field of Search ................................ 524/734, 457, 524/50, 52, 534, 542, 270, 272, 821, 823, 824

(56) References Cited

U.S. PATENT DOCUMENTS

| | | | |
|---|---|---|---|
| 4,065,423 A | * 12/1977 | Hen | |
| 5,156,718 A | * 10/1992 | Neubert | |
| 5,358,998 A | * 10/1994 | Wendel et al. | 524/734 |
| 5,565,511 A | 10/1996 | Braud et al. | |
| 5,703,156 A | * 12/1997 | Sauer | 524/802 |
| 5,962,564 A | 10/1999 | Braud et al. | |
| 6,169,132 B1 | 1/2001 | Fickeisen et al. | |
| 6,242,515 B1 | * 6/2001 | Zhao et al. | 524/190 |
| 6,271,300 B1 | * 8/2001 | Ohsumi et al. | |

FOREIGN PATENT DOCUMENTS

| | | |
|---|---|---|
| EP | 0 036 170 | 9/1981 |
| EP | 0 182 628 | 5/1986 |
| EP | 0 620 243 A1 | 10/1994 |
| EP | 0 962 510 A2 | 12/1999 |
| GB | 1 563 236 | 3/1980 |
| WO | WO 99/37716 | 7/1999 |

* cited by examiner

Primary Examiner—Tae H. Yoon
(74) Attorney, Agent, or Firm—Oblon, Spivak, McClelland, Maier & Neustadt, P.C.

(57) ABSTRACT

An aqueous composition containing from 1 to 60% by weight of a polymer A) built up from a) from 10 to 50% by weight of a vinylaromatic having up to 20 carbon atoms, b) from 45 to 75% by weight of a nonaromatic hydrocarbon having two conjugated double bonds, c) from 0 to 20% by weight of a water-soluble monomer having a water solubility of at least 100 g per liter of water under standard conditions (21° C. and 1 bar), the water-soluble monomer containing no acid group or acid anhydride group, d) from 0.1 to 4.5% by weight of a monomer containing at least one acid group or acid anhydride group, e) from 0 to 30% by weight of a monomer other than a) to d), and from 40 to 99% by weight of a filler B), the weight data for A) and B) being based on the sum of A) and B).

23 Claims, No Drawings

FLOORING ADHESIVES BASED ON STYRENE-BUTADIENE COPOLYMERS

The present invention relates to aqueous compositions containing from 1 to 60% by weight of a polymer A) built up from
- a) from 10 to 50% by weight of a vinylaromatic having up to 20 carbon atoms,
- b) from 45 to 75% by weight of a nonaromatic hydrocarbon having two conjugated double bonds,
- c) from 0 to 20% by weight of a water-soluble monomer having a water solubility of at least 100 g per liter of water under standard conditions (21° C. and 1 bar), the water-soluble monomer containing no acid group or acid anhydride group,
- d) from 0.1 to 4.5% by weight of a monomer containing at least one acid group or acid anhydride group,
- e) from 0 to 30% by weight of a monomer other than a) to d), and from 40 to 99% by weight of a filler B), the weight data for A) and B) being based on the sum of A) and B).

Aqueous dispersions of styrene-butadiene copolymers and their use as binders in adhesives for floor coverings are known from U.S. Pat. Nos. 5,565,511 and 5,962,564.

EP-A-620243, EP-A-962510 and WO 9937716 describe flooring adhesives and their preparation. The flooring adhesives therein are essentially based on polyacrylate binders, the description also mentioning vinylaromatics and dienes as monomers of which the binder may be composed.

Adhesives generally are required to display good adhesion—in other words, to stick well to the substrate—and good cohesion—in other words, to hold together well within the adhesive film. Adhesives for floor coverings are subject to particular requirements. Here, there is the desire in particular for good wet bonding capacity. A good wet bonding capacity means that after a carpet, for example, has been laid on the substrate which is coated with the aqueous dispersion, the carpet can initially still be aligned and its position corrected but that, soon thereafter, a slipproof bond develops whose strength increases as drying progresses.

A good dry gripping capacity means that even after a long period of ventilation a carpet, after having been laid on the substrate, which is then dry, gives a firm, slipproof bond.

A further desired aim is to dispense with volatile organic constituents, such as solvents or plasticizers, in order to avoid subsequent exposure to corresponding emissions.

Further important requirements are that the binders are readily processable with tackifier resins, e.g., rosins, and that the formulations obtained have a high stability.

Existing flooring adhesives based on styrene-butadiene copolymers do not yet meet the diverse and different requirements in this sector to a satisfactory extent.

It is an object of the present invention to provide flooring adhesives based on styrene-butadiene copolymers which satisfy the requirements described above as far as possible and result in a balanced profile of properties.

We have found that this object is achieved by the composition described above and by its use as a flooring adhesive.

| The aqueous composition preferably contains | |
|---|---|
| from 10 to 45% by weight, and | with particular preference from 10 to 30% by weight, of the polymer A) defined at the outset, |
| from 55 to 90% by weight, | with particular preference from 70% by weight to 90% by weight, of a filler B). |

The percentages by weight are based on the total weight of A) and B).

In one preferred embodiment the aqueous composition further comprises a tackifying resin C), also referred to as a tackifier.

The amount of the tackifier is preferably from 1 to 50 parts by weight, with particular preference from 5 to 30 parts by weight, based on the 100 parts by weight of the sum of A)+B).

On the composition of the polymer A):

The weight fraction of the monomer c) in the polymer is preferably from 0.1 to 20% by weight, with particular preference from 5 to 15% by weight, based on the polymer.

Especially if the monomer d) content is not more than 4% by weight, the fraction of the monomer c) is from 0.1 to 20% by weight, preferably from 5 to 15% by weight.

Moreover, the following compositions of the polymer A) are preferred:
- a) from 10 to 40% by weight, with particular preference from 20 to 30% by weight.
- b) from 50 to 75% by weight, with particular preference from 55 to 65% by weight.
- c) from 0.1 to 20% by weight, with particular preference from 1 to 20% by weight.
- d) from 0.1 to 4.5% by weight, with particular preference from 0.1 to 4% by weight.
- e) from 0 to 30% by weight, with particular preference from 0 to 10% by weight.

The weight data for the monomers of the polymer A) in each case add up to 100% by weight.

Examples of suitable monomers a) include vinyltoluene, α- and p-methylstyrene, α-butylstyrene, and styrene. Styrene is preferred.

Examples of suitable monomers b) include butadiene, isoprene, and chloroprene. Butadiene is preferred.

Preferred monomers c) have a water solubility of at least 300 g per liter of water (21° C., 1 bar), with particular preference at least 700 g/liter of water.

Preferred monomers c) are those containing a nitrile group.

Particular preference is given to acrylonitrile and methacrylonitrile.

Suitable monomers d) are acrylic acid, methacrylic acid, itaconic acid, maleic acid, fumaric acid and their anhydrides and monoesters.

Particular preference is given to itaconic acid, acrylic acid, and methacrylic acid.

With particular preference, monomers d) comprise itaconic acid or a mixture of monomers containing at least 20% by weight of itaconic acid.

Further monomers e) may be, for example, $C_1$–$C_{20}$ alkyl (meth)acrylates, vinyl esters having up to 20 carbon atoms, vinyl halides or other monomers, provided that they do not affect the water solubility of the monomers c).

The polymer A) has a low crosslinking density.

For a given monomer composition, a suitable measure of the crosslinking density is the transverse nuclear magnetic resonance relaxation time of the protons chemically bonded to the polymer ($^{1H}T_2$). In this document, it was determined on a sample of the respective aqueous polymer dispersion, filmed at 25° C. and then dried at 80° C. for 2 h, at a sample temperature of 140° C. and a $^1H$ resonance frequency of 20 MHz. The relationship between $^{1H}T_2$ and the crosslinking density is described, for example, in Macromolecules 1994, 27, 2111–2119. Ultimately it is based on the fact that the transverse nuclear magnetic resonance relaxation time of an atomic nucleus having a magnetic moment is, on the one hand, a measure of the mobility of said nucleus in an external magnetic field, and crosslinking of polymer chains different from one another restricts their mobility. The lower the mobility of a polymer chain, i.e., the greater the crosslinking density, the shorter the transverse nuclear magnetic resonance relaxation time of atomic nuclei chemically bonded to this polymer chain and having a magnetic moment.

In the case of the polymer A), $^{1H}T_2$ is preferably greater than 10 ms, with particular preference greater than 12 ms (ms=milliseconds).

The glass transition temperature of the polymer is preferably from −60 to −10° C., in particular from −40° C. to −15° C., and with very particular preference from −15 to −30° C.

The glass transition temperature of the polymer may be determined in accordance with customary methods such as differential thermoanalysis or differential scanning calorimetry (see, e.g., ASTM 3418/82, midpoint temperature).

The polymer A) is prepared in general by means of free-radical addition polymerization. Suitable polymerization methods, such as bulk, solution, suspension or emulsion polymerization, are known to the skilled worker.

The copolymer is preferably prepared by solution polymerization with subsequent dispersion in water or, with particular preference, by emulsion polymerization, to give aqueous copolymer dispersions.

The emulsion polymerization may be conducted batchwise, with or without the use of seed lattices, with all or some constituents of the reaction mixture being included in the initial charge, or, preferably, with some being included in the initial charge and the remainder of all or some constituents of the reaction mixture being metered in subsequently, or else in accordance with the metering technique without an initial charge.

In the emulsion polymerization, the monomers may as usual be polymerized in the presence of a water-soluble initiator and of an emulsifier at preferably from 30 to 95° C.

Examples of suitable initiators are sodium, potassium and ammonium persulfate, tert-butyl hydroperoxide, water-soluble azo compounds, or else redox initiators such as $H_2O_2$/ascorbic acid.

Examples of emulsifiers used are alkali metal salts of relatively long-chain fatty acids, alkyl sulfates, alkylsulfonates, alkylated arylsulfonates or alkylated biphenyl ether sulfonates. Further suitable emulsifiers are reaction products of alkylene oxides, especially ethylene oxide or propylene oxide, with fatty alcohols, fatty acids or phenol, or else with alkylphenols.

In the case of aqueous secondary dispersions, the copolymer is first of all prepared by solution polymerization in an organic solvent and is then dispersed in water without the use of an emulsifier or dispersing auxiliary but with the addition of salt formers, e.g., of ammonia for carboxyl-containing copolymers. The organic solvent may be removed by distillation. The preparation of aqueous secondary dispersions is known to the skilled worker and is described, for example, in DE-A-37 20 860.

In the course of the polymerization it is possible to use regulators in order to adjust the molecular weight. Suitable examples are compounds containing —SH, such as mercaptoethanol, mercaptopropanol, thiophenol, thioglycerol, ethyl thioglycolate, methyl thioglycolate, and tert-dodecyl mercaptan.

Preferably, polymer A) is prepared by emulsion polymerization in the presence of from 0.1 to 5 parts by weight, with particular preference from 0.5 to 3.5 parts by weight, with very particular preference from 2 to 3 parts by weight, of a molecular weight regulator, based on 100 parts by weight of monomers.

On the Fillers B)

Suitable fillers B) include, in particular, inorganic fillers. Mention may be made, for example, of finely ground or precipitated chalks having an average particle diameter of in general from 2 to 50 $\mu$m and/or quartz flour having a customary average particle diameter of from 3 to 50 $\mu$m.

On the Tackifying Resins C)

Preferred resins C) are resins based on abietic acid or modified abietic acid, e.g., hydrogenated or disproportionated abietic acid, or esters of these compounds, having a glass transition temperature of from 0 to 90° C., preferably from 40 to 85° C.

Resins C) of this kind are known in particular as rosins.

The composition of the invention may further comprise wetting agents or dispersants, e.g., for the fillers, thickeners, and also, for example, further customary adjuvants, such as defoamers and preservatives.

Wetting agents or dispersants may be present, for example, in amounts of from 0 to 5% by weight, thickeners in amounts of from 0 to 10% by weight, preservatives in amounts of from 0 to 1% by weight, and defoamers in amounts of from 0 to 5% by weight in the aqueous composition. These amounts by weight relate to the sum of all constituents of the aqueous composition with the exception of water.

The composition is preferably substantially free, preferably free, from organic solvents and plasticizers such as, for example, butyl acetate, toluene or phthalates. It therefore comprises organic compounds having a boiling point of below 300° C. under atmospheric pressure (1 bar) in amounts of below preferably 0.5% by weight, with particular preference below 0.1% by weight, with very particular preference below 0.05% by weight, and in particular below 0.01% by weight. With particular preference, the composition of the invention or the flooring adhesive of the invention meets requirements of freedom from emissions as defined by the Gemeinschaft Emissionskontrollierter Verlegewerkstoffe [German Association for Controlled-Emission Installation Materials; GEV].

The emissions are determined by means of a chamber test method. The flooring adhesive or the composition of the invention is applied at a rate of 300 g/m² to a glass plate whose size depends on the volume of the chamber. The chamber is loaded with 0.4 m² of the coated glass plate per m³ of chamber volume. The emission conditions in the stainless steel testing chamber (volume at least 125 liters) are 23° C., 50% relative atmospheric humidity, and an hourly air-change regime which effects total exchange of the air every 2 hours. The long-term emissions are determined after days. For this purpose, a defined volume of the air stream is passed over adsorbents. Following desorption, the emitted substances are determined by gas chromatography (GC-MS coupling) or liquid chromatography. The long-term emissions are determined in $\mu$g/m³, using toluene as a standard substance. Emitted substances whose chamber concentration is greater than 20 $\mu g/m^3$ are identified, and calibration is carried out with the pure substance identified. Emitted substances whose chamber concentration is less than 20 $\mu g/m^3$ are not identified individually. In these cases, calibration takes place with toluene.

The values for all the substances are added up.

In the case of the composition of the invention, the emission value for the sum of all organic compounds is not more than 35 preferably 1500 $\mu g/m^3$, and in particular not more than 500 $\mu g/m^3$.

The aqueous composition may be prepared in a simple manner, for example, by adding the resins B) and C) and the fillers and any further additives, with stirring, to the aqueous dispersion of the polymer A) that is obtained in the emulsion polymerization.

The components A), B) and C) are readily processable with one another and the aqueous compositions obtained are stable, possessing, in particular, stability under shearing and storage.

The water content of the aqueous composition is generally from 7 to 50, in particular from 10 to 30% by weight, based on the overall aqueous composition.

The aqueous composition is suitable as an adhesive, especially as an adhesive for bonding substrates made of plastic, wood, metal or textiles formed from woven and/or nonwoven fibers. The aqueous composition is particularly suitable as a flooring adhesive, especially for bonding floor coverings of any kind, including in particular textile floor coverings, to substrates, e.g., of wood, plastic or, in particular, mineral substrates, such as screeding, concrete or ceramic tiles.

The aqueous composition is very particularly suitable as a flooring adhesive for carpets or other floor coverings made, for example, from PVC (in configuration as multilayer coverings or homogeneous coverings), foam coverings with a textile backing (e.g., jute), polyester nonwoven, rubber coverings, textile coverings with, for example, various backings (such as polyurethane foam, styrene-butadiene foam, or a textile secondary backing), needlefelt floor coverings, polyolefin coverings or linoleum coverings, on substrates such as wood, screeding, concrete, ceramic tiles, metal substrates or the like.

The adhesive may be applied to the substrate using, for example, a toothed applicator. After customary venting, the floor covering is laid. The adhesive composition of the invention features a good level of performance properties such as peel strength, shear strength, wet bonding capacity, dry gripping capacity, and thermal stability.

EXAMPLES

I. Aqueous Composition

1. Preparation of Polymers A) by Emulsion Polymerization

Various polymers A) were prepared by customary emulsion polymerization.

For the emulsion polymerization, a polystyrene seed (1.5% by weight based on monomers) and a third of the amount of itaconic acid were included in the initial charge.

The polymerization temperature was 78° C. The initiator used was sodium persulfate and the emulsifier used was Texapon® NSO—IS (aliphatic ethoxylated Na salt).

The monomers are metered in over a period of 5.5 hours and the initiator solution over a period of 6 hours.

The composition of the polymers is indicated in Table 1:

TABLE 1

Comparative experiments $V_1$–$V_6$, inventive $D_1$

|  | $V_1$ | $V_2$ | $V_3$ | $V_4$ | $V_5$ | $V_6$ | $D_1$ |
|---|---|---|---|---|---|---|---|
| Bu % by weight | 70 | 70 | 70 | 60 | 60 | 60 | 60 |
| S % by weight | 25 | 25 | 25 | 25 | 25 | 35 | 26.5 |
| AA % by weight | 3.5 | 3.5 | 3.5 | 5 | 3.5 | 3.5 | 2 |
| AN % by weight |  |  |  | 10 | 10 | — | 10 |
| IA % by weight | 1.5 | 1.5 | 1.5 |  | 1.5 | 1.5 | 1.5 |
| tDMC | 2.0 | 1.5 | 1.0 | 2.3 | 2.3 | 2.3 | 2.3 |
| Texapon NSO-IS | 0.75 | 0.75 | 0.75 | 0.75 | 0.75 | 0.75 | 0.75 |
| PS nm | 187 | 172 | 200 | 132 | 188 | 193 | 196 |
| $T_2$ ms | 14.2 | 6.6 | 4.6 | 4.5 | 14.4 | 23.3 | 11 |
| Tg (° C.) | −48.6 | −46.3 | −46.8 | −20.8 | −27.1 | −34.6 | −27.7 |
| SC % by weight | 51.3 | 51.8 | 51.3 | 53.9 | 48.9 | 53.8 | 57.8 |

Bu: butadiene
S: styrene
AA: acrylic acid
AN: acrylonitrile
IA: itaconic acid
tDMC: molecular weight regulator tertiary-dodecyl mercaptan (parts by weight per 100 parts by weight of monomers)
SC: solids content
PS: particle size
$T_2$: transverse nuclear magnetic resonance relaxation time as a measure of crosslinking density (for measurement method see above)
Tg: glass transition temperature 2. Preparation of the Aqueous Compositions The polymer dispersions from $V_1$–$V_6$ and $D_1$ were mixed with the fillers, tackifiers and further additives stated in Table 2. The amount of the dispersion was chosen so that the polymer A) content was identical.

TABLE 2

| $V_1$ | 166 | — | — |  |  |  |  |
|---|---|---|---|---|---|---|---|
| $V_2$ | — | 164 | — |  |  |  |  |
| $V_3$ | — | — | 166 |  |  |  |  |
| $V_4$ |  |  |  | 158.2 |  |  |  |
| $V_5$ |  |  |  |  | 174.4 |  |  |
| $V_6$ |  |  |  |  |  | 158.6 |  |
| $D_1$ |  |  |  |  |  |  | 147.6 |
| Resin melt | 70 | 70 | 70 | 70 | 70 | 70 | 70 |

TABLE 2-continued

| | | | | | | | |
|---|---|---|---|---|---|---|---|
| (Burez LE3004/WW 60:40) | | | | | | | |
| Disponil FES 77 | 2.5 | 2.5 | 2.5 | 2.5 | 2.5 | 2.5 | 2.5 |
| Latekoll D 2% solution | 15.5 | 17.5 | 15.5 | 23.3 | 7.1 | 22.9 | 33.9 |
| Agitan VP 282 | 1 | 1 | 1 | 1 | 1 | 1 | 1 |
| Lumiten NOG | 2.5 | 2.5 | 2.5 | 2.5 | 2.5 | 2.5 | 2.5 |
| Pigmentverteiler NL | 2.5 | 2.5 | 2.5 | 2.5 | 2.5 | 2.5 | 2.5 |
| Lumiten I DS3525 | 1 | 1 | 1 | 1 | 1 | 1 | 1 |
| Burez LE 3004 | 20 | 20 | 20 | 20 | 20 | 20 | 20 |
| Ulmer Weiss XM | 219 | 219 | 219 | 219 | 219 | 219 | 219 |

Amounts in parts by weight
Burez LE3004/WW 60:40: Tackifier resin (ester of abietic acid) from Erbslöh/balsam resin from Hermann
Disponil FES 77: Dispersing auxiliary (Henkel)
Latekoll: Thickener (BASF)
Agitan: Defoamer (Münzing)
Lumiten NOG: Dispering auxiliary (BASF)
Pigmentverteiler NL: Dispersing auxiliary (BASF)
Lumiten I DS3525: Dispersing auxiliary (BASF)
Ulmer Weiss XM: Filler (Ulmo-Füllstoff-Vertrieb)

II. Performance Testing

Wet Bonding Capacity (WBC)

The adhesive is applied using a DIN coater to a cement fiberboard panel (e.g. Eternit® 2000) (20×50 cm) in the direction of takeoff. The amount applied is about 350–400 g/m². Needlefelt floor covering strips (NFC strips) are placed in the bed of adhesive following a venting period of 10 minutes and are pressed on with a 2.5 kg roller by rolling backward and forward 3 times. At the stated intervals of time the strips are pulled off with a takeoff device, during which the increase in the peel resistance is measured in N/5 cm.

Dry Gripping Capacity (DGC)

The adhesive is applied using a DIN coater to a cement fiberboard panel (e.g., Eternit® 2000) (20×50 cm) in the direction of takeoff. The amount applied is about 250–300 mg/m². PVC strips (Pegulane® B 1) are placed in the bed of adhesive following varying venting periods and are pressed on with a 2.5 kg roller by rolling backward and forward (3×). Subsequently, the strips are pulled off with a takeoff device and the peel resistance is measured in N/5 cm.

Peel Strength

The peel strength was determined in accordance with DIN 16860. For the peel strength, different coverings are tested:
NFC: needlefelt floor covering
Norament: rubber covering
PO: polyolefin covering
PVC: PVC covering The results are set out in Table 3.

TABLE 3

Results

| Dispersion | $V_1$ | $V_2$ | $V_3$ | $V_4$ | $V_5$ | $V_6$ | $D_1$ |
|---|---|---|---|---|---|---|---|
| WBC N/5 cm 10 min | 4 | 5 | 3 | 3 | 7 | 7 | 10 |
| 15 min | 7 | 7 | 5 | 3 | 12 | 12 | 13 |
| 20 min | 11 | 12 | 8 | 3 | 22 | 15 | 20 |
| 30 min | 18 | 28 | 17 | 8 | 40 | 40 | 40 |
| DGC N/5 cm 10 min | 2 | 1 | 1 | 2 | 2 | 1 | 1 |
| 20 min | 5 | 5 | 1 | 1 | 4 | 4 | 8 |
| 30 min | 2 | 2 | 1 | 0 | 3 | 4 | 17 |
| 45 min | 1 | 1 | 0 | | 2 | 3 | 11 |
| Peel strength NFC (N/mm) 10 min venting time) | 1.0 | 1.4 | 1.5 | 1.2 | 2.3 | 1.7 | 1.9 |
| Peel strength PVC (N/mm) 10 min venting time) | 0.5 | 0.3 | 0.3 | 0.4 | 0.9 | 0.8 | 1.1 |
| Peel strength PO (N/mm) 10 min venting time) | 0.6 | 0.3 | 0.2 | 0.4 | 0.4 | 0.7 | 1.7 |
| Peel strength Norament (N/mm) 10 min venting time) | 1.8 | 2.0 | 2.0 | 0.5 | 1.4 | 2.0 | 2.2 |

We claim:

1. An aqueous composition comprising water and from 1 to 60% by weight of a polymer A) comprising polymerized units of
   (i) from 20 to 30% by weight of at least one vinylaromatic monomer having up to 20 carbon atoms, based on the total weight of A,
   (ii) from 45 to 75% by weight of at least one nonaromatic hydrocarbon having two conjugated double bonds, based on the total weight of A,
   (iii) from 0.1 to 20% by weight of at least one water-soluble monomer having a water solubility of at least 100 g per liter of water at 21° C. and 1 bar, said water-soluble monomer containing no acid group or acid anhydride group, based on the total weight of A,
   (iv) from 0.1 to 4.5% by weight of at least one monomer containing at least one acid group or acid anhydride group, based on the total weight of A,
   (v) from 0 to 30% by weight of at least one monomer other than (i) to (iv), based on the total weight of A,
   and from 40 to 99% by weight of at least one filler B),
   wherein weight % for A) and B) is based on the total weight of A) and B) and
   wherein component (iv) comprises itaconic acid and at least one monomer selected from the group consisting of acrylic acid, methacrylic acid, maleic acid and fumaric acid.

2. The aqueous composition as claimed in claim 1, wherein the monomer (iv) content is from 0.1 to 4% by weight.

3. The aqueous composition as claimed in claim 1, wherein monomers (iii) comprise monomers containing a nitrile group.

4. An aqueous composition as claimed in claim 1, wherein the glass transition temperature of the polymer A) is from −10 to −60° C.

5. An aqueous composition as claimed in claim 1, wherein polymer A) is in the form of an aqueous polymer dispersion.

6. An aqueous composition as claimed in claim 5, wherein the polymer dispersion is obtained by emulsion polymerization using from 0.1 to 5 parts by weight of a molecular weight regulator, based on 100 parts by weight of monomers.

7. An adhesive comprising the composition as claimed in claim 1.

8. A flooring adhesive comprising the composition as claimed in claim 1.

9. A substrate coated with an aqueous composition as claimed in claim 1.

10. The aqueous composition of claim 1, wherein the transverse nuclear magnetic resonance relaxation time is at least 12 ms.

11. A method for preparing the composition of claim 1, said method comprising
    adding the filler to a stirred aqueous dispersion of polymer A).

12. The aqueous composition of claim 1, further comprising a tacifying resin C).

13. The composition of claim 12, wherein the tacifying resin C) is selected from the group consisting of a resin based on abietic acid, a resin based on modified abietic acid and mixtures thereof.

14. The aqueous composition of claim 1, further comprising an additive selected from the group consisting of a wetting agent, a dispersant, a thickener, a defoamer and a preservative.

15. A method comprising
    applying an adhesive to a substrate and placing said substrate on a surface,
    wherein said adhesive comprises the composition of claim 1.

16. The method of claim 15, wherein the substrate is a floor covering.

17. The composition of claim 1, wherein the vinylaromatic monomer (i) is present in an amount of 26.5% by weight, the nonaromatic hydrocarbon (ii) is present in an amount of 60% by weight, the water-soluble monomer (iii) is present in an amount of 10% by weight, the monomer (iv) containing at least one acid group is present in an amount of 3.5% by weight and the transverse nuclear magnetic resonance relaxation time is 11 ms.

18. The composition of claim 1, wherein the vinyl aromatic monomer (i) is styrene.

19. The composition of claim 1, wherein the non-aromatic hydrocarbon (ii) is butadiene.

20. The composition of claim 1, wherein the water-soluble monomer (iii) is acrylonitrile or methacrylonitrile.

21. The composition of claim 1, wherein the monomer (v) is selected from the group consisting of $C_1$–$C_{20}$ alkyl (meth)acrylates, vinyl esters having up to 20 carbon atoms, vinyl halides and mixtures thereof.

22. The aqueous composition as claimed in claim 1, wherein the polymer A) has a transverse nuclear magnetic resonance relaxation time of at least 10 ms.

23. The aqueous composition as claimed in claim 1, wherein component (iv) comprises at least 20% by weight of itaconic acid based on the total weight of the monomers containing at least one acid group or acid anhydride group.

* * * * *